(12) United States Patent
Lagares Corominas

(10) Patent No.: US 10,842,159 B2
(45) Date of Patent: Nov. 24, 2020

(54) FORCED CONVECTION TREATMENT UNIT

(71) Applicant: Metalquimia, S.A., Girona (ES)

(72) Inventor: Narcis Lagares Corominas, Girona (ES)

(73) Assignee: METALQUIMIA, S.A., Girona (ES)

(*) Notice: Subject to any disclaimer, the term of this patent is extended or adjusted under 35 U.S.C. 154(b) by 7 days.

(21) Appl. No.: 16/414,772

(22) Filed: May 16, 2019

(65) Prior Publication Data

US 2019/0269142 A1    Sep. 5, 2019

Related U.S. Application Data

(60) Division of application No. 14/281,891, filed on May 20, 2014, now abandoned, which is a (Continued)

(30) Foreign Application Priority Data

Jan. 28, 2009    (EP) .................................... 09380012

(51) Int. Cl.
*A22C 11/02*    (2006.01)
*A47J 37/04*    (2006.01)

(52) U.S. Cl.
CPC ............. *A22C 11/02* (2013.01); *A47J 37/045* (2013.01)

(58) Field of Classification Search
CPC ........ A47J 37/045; A47J 27/14; A47J 37/044; A47J 37/043; A47J 37/04
USPC ......... 99/330, 326, 333, 337, 338, 386, 401, 99/451, 467, 443 C, 443 R, 483; 219/388, 400, 492, 497, 702, 714, 775,
(Continued)

(56) References Cited

U.S. PATENT DOCUMENTS 1,541,889 A    6/1925    Baetz
2,543,073 A    6/1925    Fiege
(Continued)

FOREIGN PATENT DOCUMENTS

DE    10221254 A1    12/2003
ES    2077217 A    11/1995
(Continued)

OTHER PUBLICATIONS

Collins English Dictionary, definition of expanded metal, (2014). In Collins dictionaries (Ed.), Collins English dictionary (12th ed.), London, UK: Collins. Retrieved from: https://search.credoreference.com/content/entry/hcengdict/expanded_metal/0?InstitutionID=743 (Year: 2014).

*Primary Examiner* — Phuong T Nguyen
(74) *Attorney, Agent, or Firm* — Robert J. Hess; Hess Patent Law Firm

(57) ABSTRACT

The forced convection treatment unit has a conveyor device for conveying slices of meat product arranged in a single layer on a permeable support surface along a path inside an enclosure, and an air circulation device with an air moving device associated to an arrangement of conduits provided with a plurality of inlet and outlet ports in communication with the inside of the enclosure and arranged to make two mutually parallel conditioned air currents flow in opposite directions parallel to the support surface and transverse to the direction of travel of the conveyor device and pass through two respective regions of the enclosure traversed by the slices along the path.

13 Claims, 4 Drawing Sheets

Related U.S. Application Data continuation-in-part of application No. 13/145,459, filed as application No. PCT/IB2010/000124 on Jan. 26, 2010, now abandoned.

(58) Field of Classification Search
USPC ........ 219/779; 426/392, 394, 438, 439, 443, 426/497, 615, 634, 641, 656
See application file for complete search history.

(56) References Cited

U.S. PATENT DOCUMENTS

| | | |
|---|---|---|
| 1,550,422 A | 8/1925 | Braemer |
| 2,189,611 A | 2/1940 | Mack |
| 2,346,232 A | 4/1944 | Piret |
| 3,634,102 A | 1/1972 | Paynter et al. |
| 3,738,016 A | 6/1973 | Margittai |
| 4,378,873 A | 4/1983 | Cloudy |
| 4,791,909 A * | 12/1988 | Kalthoff ............ A23B 4/052 126/21 A |
| 4,961,373 A | 10/1990 | Milone |
| 6,524,633 B2 | 2/2003 | Rainbolt et al. |
| 6,713,107 B2 | 3/2004 | Shefet et al. |
| 2002/0071899 A1 | 6/2002 | Rainbolt |
| 2002/0073667 A1 | 6/2002 | Barris |
| 2004/0053104 A1 | 3/2004 | Novkov |

FOREIGN PATENT DOCUMENTS

| | | |
|---|---|---|
| FR | 2787179 A | 6/2000 |
| GB | 479131 A | 2/1938 |
| GB | 1402652 A | 8/1975 |
| JP | 0269135 H | 3/1990 |
| MX | PA00 001 245 A | 4/2002 |
| WO | 2008/135616 A | 11/2008 |

* cited by examiner

FORCED CONVECTION TREATMENT UNIT

CROSS-REFERENCE TO COPENDING PATENT APPLICATIONS

This is a division of patent application Ser. No. 14/281,891 filed May 20, 2014, which in turn is a continuation-in-part of application Ser. No. 13/145,459 filed Jul. 20, 2011, which in turn is a national stage entry of PCT/IB2010/000124 filed Jan. 26, 2010.

TECHNICAL FIELD

The present invention relates to a forced convection treatment unit for treating a meat product, more particularly a sausage meat product cut into slices, by subjecting it to two conditioned air currents in opposite directions.

BACKGROUND OF THE INVENTION

A number of traditional processes for preparing matured or cured meat products, especially sausage meat products, which can be preserved for longer or shorter time periods depending on their degree of curing, are well known. Such processes generally comprise preparing a mass with one or more comminuted meat products, optionally with one or more condiments, and stuffing said mass in a casing to form sausage products. The mass is allowed to ferment by hanging the sausage products in a fermentation chamber at a controlled temperature depending on each type of sausage product and for a predetermined time period which can vary from 1 to several days. In some varieties, the sausage products can be smoked during or after the fermentation. Finally, the sausage products are hung and allowed to dry for a time period sufficient to achieve a predetermined moisture reduction in the product, and this drying period can be prolonged from 10 days, for the tenderest products, up to several months for the most cured sausage products. The food industry has proposed for a long time a number of apparatuses and processes to reduce the drying time of sausage products.

U.S. Pat. No. 2,346,232, filed on 1942, describes a process for rapidly preparing a dried meat product, comprising comminuting meat with a natural water content of 45% to 85% at a temperature below the softening point of the fatty portions contained in the meat, placing the meat once thus comminuted in a relatively thin layer, and forcing an air current against the surface of the meat at a sufficiently high speed to cause turbulence of the air, until the moisture content of the meat has been reduced by 20% to 55%. The forced air is at a temperature of 0° C. to 30° C., and has a relative humidity less than 75%.

Patent MX PA00001245 A describes a process for preparing sausage products comprising preparing a mixture of meat for sausage products, spreading the mixture in the form of a sheet, and fermenting and cooking the resulting product. Then, the product is cut into slices after having cooled it to a sufficiently low temperature, the slices are deposited in a conveyor of a spiral dryer, and conditioned air with a relative humidity less than 50% and at a temperature between 10° C. and 50° C. is made to pass inside and through the spiral dryer while the product, in slices is conveyed through the spiral dryer for sufficient time to reduce the moisture to a predetermined level. The mentioned spiral dryer has a construction similar to a cooking oven described in patent ES-A-2077217 T3, which can operate with steam or with hot air. The oven comprises a conveyor provided with a permeable support surface on which the food products are deposited, and which describes an upward spiral path inside a cooking chamber, and ventilating means for circulating the steam or the hot air from top to bottom and around the food products located in the conveyor inside the cooking chamber.

Patent JP-A-2069135 describes a dryer with a wire mesh belt conveyor having several superimposed sections moving in alternately opposite directions, where the material to be dried is cut into slices, introduced into the dryer, and arranged first on an upper conveyor section, it is then successively passed, falling from one to another, from the end of each section to the start of the immediately lower section, until finally reaching the lowest conveyor section, from the end of which the product is extracted from the dryer. While they are conveyed in the upper sections, the slices of product are irradiated with infrared rays from distant infrared heaters, while at the same time ventilating means make hot air pass in countercurrent in relation to the direction of travel of the upper conveyor sections. In the lower conveyor sections, other ventilating means make hot air pass in a direction perpendicular to the surfaces of the lower conveyor sections.

Patent GB-A-1402652 discloses an apparatus for steaming a food product, comprising a housing defining a steaming chamber having an inlet close to the bottom and an outlet close to the upper part of said housing, and means for automatically opening and closing said inlet and outlet when trays carrying the food product are conveyed into and out from the housing. Inside the housing there is a loading conveyor for receiving the trays entering through the inlet, a conveyor for unloading the trays through the outlet and a conveyor for vertically conveying the trays between the loading conveyor and the unloading conveyor. The vertical conveyor comprises a pair of chain conveyors arranged on opposite sides of the chamber and equipped with a plurality of L-shaped bars linked to the chains and sized to support the trays. The steam is introduced from the lower part of the treatment chamber, below the loading conveyor.

International patent application WO 2008135616 discloses an installation for drying and maturing a food product cut into slices, suitable for preparing sausage products with a relatively high curing cut into slices. To that end, the installation includes first a forced convection treatment unit and then a vacuum treatment unit. The mentioned forced convection treatment unit comprises a conveyor device arranged to convey slices or pieces of the product to be treated inside an enclosure through which there a current of hot air is established in a direction parallel to the plane of the conveyor and transverse to the direction of travel thereof. The conveyor device has several superimposed horizontal sections actuated to move in alternately opposite directions and arranged such that the slices successively pass from one section to the immediately lower section. A hot air inlet port connected to an inlet conduit is arranged on one side of the enclosure and a hot air outlet port connected to an outlet conduit is arranged on the opposite side of the enclosure. The inlet and outlet conduits are connected to one another through an air heating unit, and air circulation means are arranged to circulate the hot air through said inlet and outlet conduits for the purpose of creating the mentioned current of hot air through the enclosure.

The mentioned current of hot air through the enclosure in a direction parallel to the plane of the conveyor and transverse to the direction of travel thereof has proven to be effective for achieving the treatment of the desired food product. However, the fact that the air current flows in a single direction has the drawback of an irregular drying of the slices, since the slices close to the side corresponding to the hot air inlet port are dried more than the slices close to the side corresponding to the outlet port.

In addition, it has been found that for preparing certain relatively tender sausage products, i.e., with a low degree of curing, a process for treating the product cut into slices similar to that which can be implemented by means of the installation described in the mentioned international patent application WO 2008135616 can be used, but using only the forced convection treatment unit and omitting the mentioned vacuum treatment unit.

Document U.S. Pat. No. 6,524,633 B2 discloses a process for preparing sliced sausage, e.g. pepperoni. The process includes the steps of preparing a meat mixture by grinding and mixing to specification, stuffing the meat mixture into casings for fermentation and cooking, chilling the stuffed meat mixture to 2° C. or lower and slicing it, then conveying the sliced product in a spiral dryer and exposing the product on the conveyor to relatively warm air at about 10° C. to 49° C. and at an initial relative humidity of 50% or less under turbulent air flow. Preferably, the conditioned air enters the lower portion of the spiral dryer along with the meat slices and exits the top portion. However, no means for controlling the airflow in the spiral dryer are provided, so that there is a risk of cold or hot spots to occur on the meat slices.

Document U.S. Pat. No. 3,634,102 A discloses a procedure for making dry sausage, such as salami, pepperoni and genoa sausages, made in the conventional method, grinding meat to form a batter, stuffing a casing smoking and cooking, and slowly drying to reduce the moisture to about 25-50%. The drying is accomplished by slicing the stuffed product, placing the slices in single layers on expanded metal trays in a drying chamber or tunnel with air flow over upper and lower surfaces, at a temperature of 7° C. to 18° C., and 20-25% relative humidity. However, no conveyor for moving the slices within the drying chamber or tunnel and no means for controlling the airflow in the drying chamber or tunnel are provided, so that there is a risk of cold or hot spots to occur on the meat slices.

Documents U.S. Pat. No. 6,713,107 B2 discloses an air distribution method for distributing treated air in a food processor. The methods comprises moving at least one food item over a predetermined travel path in a food processor, introducing treated air into the food processor from a plurality of inlet ports positioned proximate a first side portion of the travel pathway during the moving step to thereby treat the food, exhausting air from the food processor from a plurality of exhaust ports positioned proximate a second side portion of the travel pathway, and directing the treated air to travel from the first side portion to the second side portion over the food held on the food travel pathway during the moving step. The direction of the air flows over the food is controlled such that the air flow can flow in opposite directions so as to reduce or substantially eliminate thermal gradients across the pathway of the food processor. However, an efficient reduction or substantial elimination of thermal gradients is difficult to achieve by blowing air flows in opposite directions across the food processor due to the unpredictable mixing of confronted airflows.

DISCLOSURE OF THE INVENTION

The present invention provides a forced convection treatment unit for treating a meat product, more particularly a sausage meat product cut into slices, by subjecting the slices to two conditioned air currents in opposite directions. More specifically, the treatment unit of the present invention is useful for preparing a relatively tender sausage meat product, i.e., with a low level of curing, such as a salami or the like, cut into slices.

A process carried out in cooperation with the treatment unit comprises the following steps. Firstly, a mass is prepared with one or more comminuted meat products, which can include, for example, lean meat of pork and/or veal and pork fat or lard, optionally with one or more condiments, and said mass is stuffed in a casing, such as an intestine, which can be of cellulose or collagen, to form sausage products. As a merely guiding information, the most usual calibers for the intestine range between 60 and 120, although higher and lower calibers are possible, and the meat products are comminuted to a particle size of 2 to 3 mm.

A stoving process is then carried out in which the mass is allowed to ferment in the sausage products, for example by hanging the sausage products in a fermentation chamber at a temperature of 15° C. to 30° C. for a period of 12 hours to 3 days, for the purpose of achieving a rapid growth of microorganisms causing a reduction in the pH of the mass and a consequent coagulation of the meat proteins which will give consistency to the sausage product. The sausage products can optionally be smoked during the mentioned stoving process or at the end thereof. If the mass has sugar as an added ingredient, an attempt is generally made for the microorganisms to consume all the added sugar, such that once the mentioned stoving process has finished the pH remains constant during a subsequent drying process. This stoving process generally causes a reduction of 3% to 5% by weight of the sausage products. Finally, the sausage products are dried until achieving a predetermined weight reduction, which for relatively tender sausage products may be of 8% to 35% with respect to the weight of the fermented sausage products, i.e., at the end of the stoving process.

In a conventional process, the drying process is carried out by leaving the sausage products hanging in a maturing room for a time period which, for these relatively tender sausage products, can range between 10 and 20 days. The conditions in the maturing chamber can be a temperature of 12° C. to 15° C. and a relative humidity of 70% to 75%, or the environmental conditions in a suitable climate. However, processes are known which allow significantly reducing the time required for the drying process by first cooling the sausage products obtained after the stoving process to a sufficient low temperature to allow them to be cut into slices, and then drying the slices by exposing them to conditioned air flow while are moved by a conveyor within an enclosure until achieving the desired weight reduction.

A problem with the conventional process is that thermal gradients usually occur within the enclosure due to a plurality of air flows flowing in different directions within the enclosure, which can produce cold or hot spots on the meat slices leading to a defective or uneven drying of the slices.

Instead of trying to reduce or substantially eliminate the thermal gradients across the conveyor in the enclosure, the process carried out by the treatment unit of the present invention provides at least two similar and opposite thermal gradients across the conveyor in two successive portions of the path thereof within different regions of the enclosure such that the two similar opposite thermal gradients complement each other providing as a result a uniform thermal treatment after the conveyor has completed said two successive portions of the path within the enclosure.

Ideally, the opposite thermal gradients are identical if the two successive portions of the path are identical. However, due to the technical difficulty of providing two identical opposite thermal gradients within different regions of the enclosure, similar opposite thermal gradients are contemplated within the scope of the present invention, with the term "similar" meaning a maximal deviation of ±10% in the maximal temperatures of the two thermal gradients and in the minimal temperatures of the two thermal gradients. It is also possible to compensate the effect of different opposite thermal gradients by providing different lengths for the two successive portions of the path, i.e. different times of treatment under each thermal gradient.

Said successive similar and opposite thermal gradients across the conveyor are provided according to the present invention by making first and second conditioned air currents pass in well-defined mutually parallel opposite directions from a first side to a second opposite side of the conveyor and along respective first and second successive portions of the path of the conveyor within corresponding first and second regions of the enclosure.

This solution is simple and easy to implement by using a forced convection treatment unit having an enclosure, a conveyor following a path within the enclosure and an air flow distribution device including inlet and outlet ports at both sides of the conveyor geometrically designed and precisely located to provide the successive mutually parallel opposite first and second conditioned air currents across the conveyor.

In the process carried out by the treatment unit of the present invention, the step of drying the slices comprises arranging the slices in a single layer on a permeable support surface and conveying the slices thus arranged along a path within an enclosure, while first and second mutually parallel conditioned air currents, in opposite directions parallel to said support surface and transverse to the direction of travel of the conveyor device, are made to pass through two respective regions of said enclosure.

The mentioned regions of the enclosure through which the first and second conditioned air currents pass are located in relation to the path of the slices within the enclosure so that the slices receive the impingement of both first and second conditioned air currents while they are conveyed along the path.

The slices are subjected to said first and second conditioned air currents for a period of 10 minutes to 70 minutes. The first conditioned air current is at a temperature of 15° C. to 40° C. and a relative humidity of 30% to 40% at an inlet port thereof, and the second conditioned air current is in the same conditions as the first conditioned air current or at a slightly lower temperature and at a slightly higher relative humidity at an inlet port thereof. The first conditioned air current will preferably have a speed of 2 m/s to 5 m/s and the second conditioned air current will have the same speed as the first one or a slightly lower speed at the respective inlet ports.

Ideally, the temperature, humidity and speed of the first and second opposite conditioned air currents are identical if the lengths of the first and second portion of the path are identical. However, due to the technical difficulty of providing two identical opposite conditioned air currents within different regions of the enclosure, similar opposite conditioned air currents are contemplated within the scope of the process carried out by the treatment unit of present invention, with the term "similar" meaning a maximal deviation of ±10% in the temperature, humidity and speed of the second conditioned air current with respect to the temperature, humidity and speed of the first conditioned air current.

Once the drying process has finished, the slices are left to cool separated to prevent them from sticking to one another due to the particles of melted fat, and finally the process comprises forming groups of dried and cooled slices arranged in a desired format and packaging the groups of slices under vacuum or in a modified atmosphere using a thermoforming machine.

As may have been verified, the method carried out by the treatment unit of the present invention allows drastically reducing the preparation time of the meat product by several days, and furthermore provides a presentation of the finished product cut into slices and packaged suitable for being marketed in self-service establishments, and which is in ever greater demand among the public.

The forced convection treatment unit of the present invention comprises a conveyor device configured to convey slices of said meat product arranged in a single layer on a permeable support surface along a path inside an enclosure, and an air circulation device configured and arranged to make conditioned air pass through the inside of said enclosure and around said slices while the slices are conveyed by said conveyor device for sufficient time to reduce the moisture of the slices to a predetermined level. The air circulation device comprises at least one air moving device, such as a ventilator device, associated to an arrangement of conduits provided with a plurality of inlet and outlet ports in communication with the inside of the enclosure and arranged to make at least first and second mutually parallel conditioned air currents, in opposite directions parallel to said permeable support surface and transverse to the direction of travel of the conveyor device, pass through two respective regions of the enclosure.

Thus, with this forced convection treatment unit, the slices which are conveyed by the conveyor device receive a first conditioned air current from a first side to an opposite second side of the enclosure during a first portion of the path through the inside of a first region of the enclosure and a second conditioned air current from an said second side to said first of the enclosure during a second portion of the path through a second region of the inside of the enclosure, said first and second conditioned air currents creating similar and opposite thermal gradients in said successive first and second regions of the enclosure with the result of a better uniformity in the drying of the slices in the entire width of the surface of the conveyor.

It will be understood that, depending on the length of the path of the conveyor, the unit can include a number of inlet and outlet ports to provide more than two parallel currents in alternately opposite directions in a plurality of successive regions of the enclosure.

The enclosure preferably has first and second opposite sides between which the path of the conveyor device runs, and the unit comprises a pair of facing first inlet and outlet ports located respectively on said first side and on said second side of the enclosure and a pair of facing second inlet and outlet ports located, in this case, respectively on the second side and on the first side of the enclosure. Said first conditioned air current is thus introduced into the enclosure through the first inlet port and is extracted through the first outlet port and said second conditioned air current is introduced into the enclosure through the second inlet port and is extracted through the second outlet port. The passage areas of all the inlet and outlet ports can have substantially the same dimensions. In an embodiment, the first inlet port and the second outlet port are mutually adjacent on the first side of the enclosure, and the first outlet port and the second inlet port are mutually adjacent on the second side of the enclosure. There is no separation inside the enclosure, and the two currents have bordering areas in contact. One or more of the first and second inlet and outlet ports are preferably equipped with a plurality of directing flanges in the form of separate superimposed sheets, parallel to the direction of the corresponding current, to aid in directing the conditioned air current passing therethrough.

According to an embodiment, the mentioned arrangement of conduits of the air circulation device comprises a pair of first inlet and outlet conduits connected respectively to the first inlet port and to the first outlet port, and a pair of second inlet and outlet conduits connected respectively to the second inlet port and to the second outlet port. This involves a double conditioned air circuit, each one with an air conditioning unit and at least one ventilator device to drive or suck the conditioned air.

According to another embodiment, the arrangement of conduits comprises an inlet conduit connected to the first inlet port, a deflector conduit connected at a first end to the first outlet port and at a second end to the second inlet port, and an outlet conduit connected to the second outlet port. With this arrangement, the air forming the first conditioned air current when it leaves the enclosure passes through the deflector conduit and then re-enters it to form the second air current, which involves a single conditioned air circuit with only one air conditioning unit and at least one ventilator device either in the inlet conduit to drive the conditioned air through the first inlet port or in the outlet conduit to suck the conditioned air through the second outlet port. Optionally, an additional ventilator device can be arranged in the deflector conduit to suck conditioned air through the first outlet port and at the same time drive conditioned air through the second inlet port.

The conveyor device can be of several types, for example a conveyor device provided with several superimposed sections such as that described in the mentioned international patent application WO 2008135616, where each conveyor section comprises at least one endless belt providing the mentioned permeable support surface on which the slices of meat product are directly arranged. Alternatively, each conveyor section can be configured to horizontally move a plurality of trays, each of which is provided with a permeable support surface on which the slices are arranged. With the use of this conveyor device provided with several superimposed sections, the pair of first conditioned air inlet and outlet ports and the pair of second conditioned air inlet and outlet ports can be located in the enclosure either side to side or one on top of the other, since the slices are conveyed into the enclosure both in a vertical direction and in alternately opposite horizontal directions.

According to a preferred embodiment, the conveyor device is configured to convey a plurality of trays, each of which is provided with a horizontal permeable support surface on which the slices are arranged in a single layer, and to vertically move said trays within the enclosure in a vertical direction from a reception level to a delivery level. In this case, the pair of first conditioned air inlet and outlet ports are sized and arranged in the enclosure to make the first conditioned air current pass through a half of the vertical path of the trays between said reception level and said delivery level, and the pair of second conditioned air inlet and outlet ports are sized and arranged to make the second conditioned air current pass through another half of the vertical path of the trays between said reception level and said delivery level. The enclosure has a tray reception opening located in the mentioned reception level and a tray delivery opening located in said delivery level. The conveyor device comprises outside the enclosure a loading conveyor for receiving trays and introducing them through said reception opening, and inside the enclosure an unloading conveyor for unloading trays through said delivery opening, and a vertical conveyor for vertically conveying the trays between the loading conveyor and the unloading conveyor. The vertical conveyor can be a chain conveyor similar to that described in the mentioned patent GB-A-1402652.

In this embodiment, the reception level is close to the bottom and the delivery level is close to the upper part of the enclosure, such that the path of the trays within the enclosure is a bottom to top upward vertical path, although an inverse construction is contemplated in which the path of the trays within the enclosure is a top to bottom downward vertical path. Whichever the upward or downward vertical path of the trays inside the enclosure, the pairs of first and second inlet and outlet ports can be arranged to make the first air current pass through the upper half and the second air current pass through the lower half of the vertical path of the trays inside the enclosure, or vice versa. According to an embodiment, the unit is built such that the vertical path of the trays inside the enclosure can be changed from upward to downward by simply reversing the operation of the actuations of the conveyor device, such that a forced convection treatment line can be built formed by two or more of such units which are linked and reversely actuated, such that, for example, the trays unloaded through the delivery opening located in the upper level of one unit are immediately loaded through the reception opening located in the upper level of the following unit, and the trays unloaded through the delivery opening located in the lower level of one unit are immediately loaded through the reception opening located in the lower level of the following unit.

BRIEF DESCRIPTION OF THE DRAWINGS

The previous and other features and advantages will be more fully understood from the following detailed description of several embodiments with reference to the attached drawings, in which.

DETAILED DESCRIPTION OF EMBODIMENTS

In the description of the different embodiments and in the figures, the same numerical references refer to equal or equivalent features.

Figure 1:
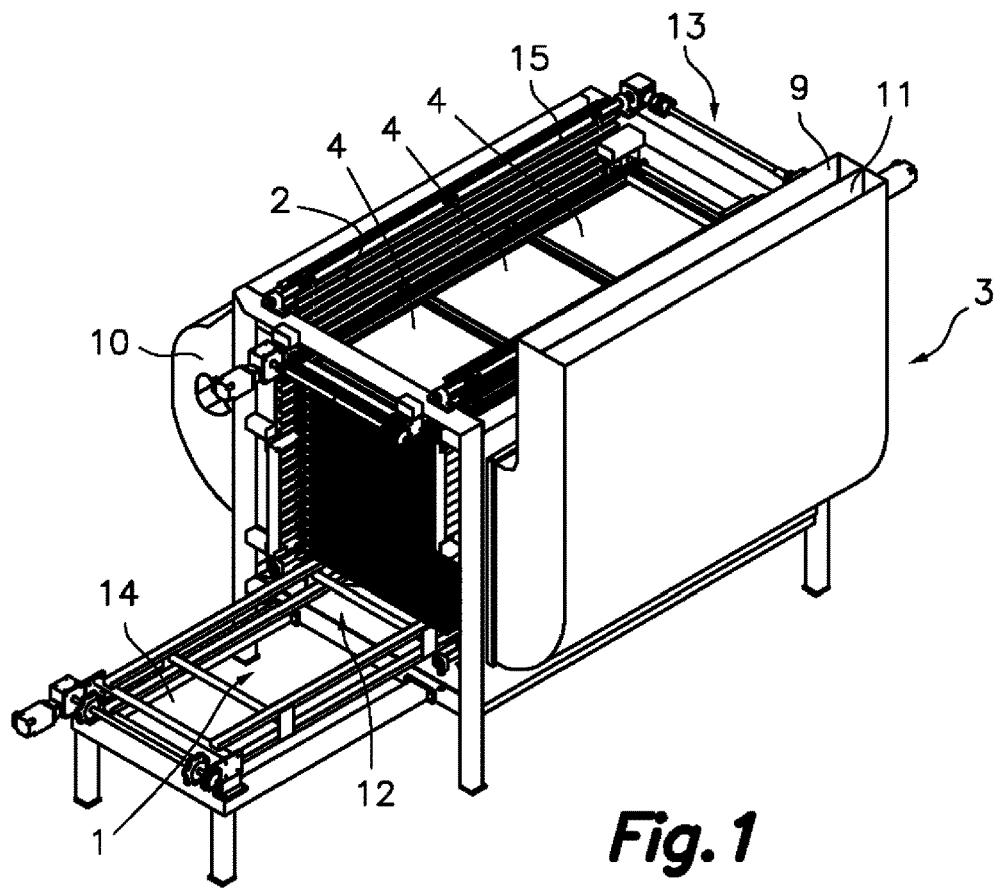
FIG. 1 is a perspective view of one embodiment of a forced convection treatment unit according to an embodiment of the present invention which is used for carrying out a process for treating a meat product cut into slices, with a housing of the treatment unit being omitted for greater clarity of the drawing.
Figure 2:
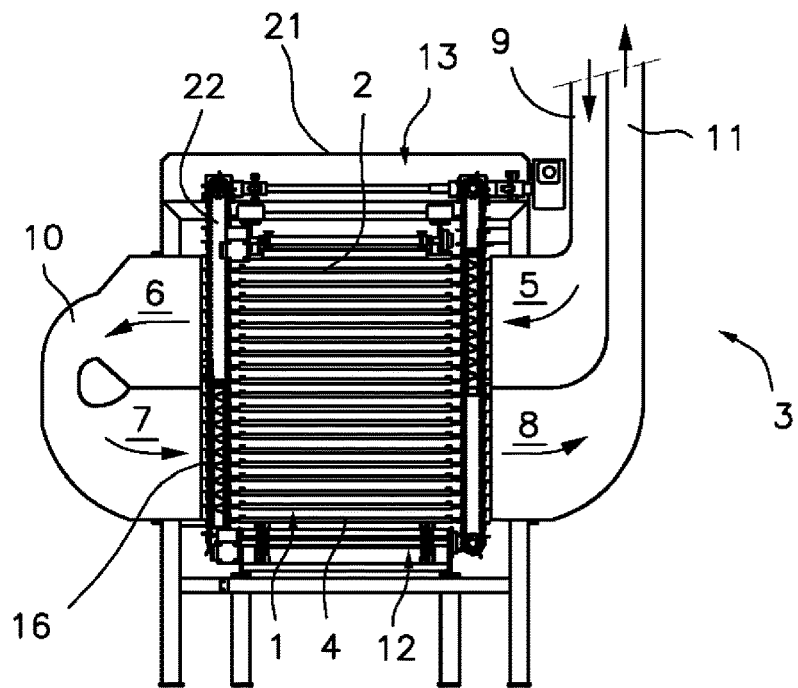
FIG. 2 is a schematic cross-section view of the treatment unit of FIG. 1.

Referring first to FIGS. 1 and 2, a forced convection treatment unit according to an embodiment of the present invention is shown, which is useful for carryings out a process for treating a meat product. The meat product is, for example, a sausage meat product cut into slices, although vegetable or fish products are not discarded. The forced convection treatment unit comprises a housing 21 defining an enclosure 2 having a reception opening 12 at one end and a delivery opening 13 at the other opposite end. The mentioned reception opening 12 is in a reception level close to the bottom of the enclosure, whereas the delivery opening 13 is in a delivery level close to the upper part of the enclosure. The housing 21 has been omitted in FIG. 1 for a greater clarity of the drawing. The unit is associated to a conveyor device 1 configured to convey the slices of meat product along a path from the reception opening 12 to the delivery opening 13 inside said enclosure 2. The slices are conveyed individually separated, arranged in a single layer, on a permeable support surface. In the first embodiment shown in FIGS. 1 and 2, the conveyor device 1 is configured to convey a plurality of trays 4, each of which has a permeable support surface, along the width and length of which the slices are arranged.

The conveyor device 1 comprises a loading conveyor 14 for receiving the trays 4 and introducing them into the enclosure 2 through said reception opening 12, an unloading conveyor 15 for unloading the trays 4 from the enclosure 2 through said delivery opening 13 and a vertical conveyor 22 for vertically conveying the trays 4 between the reception level, where they are left by the loading conveyor 14, and the delivery level, from where they are taken by the unloading conveyor 15. In FIG. 1, the trays follow an upward vertical path inside the enclosure 2. However, in an alternative embodiment, the reception level and the reception opening 12 are close to the upper part of the enclosure, the delivery level and the delivery opening 13 are close to the bottom of the enclosure and the vertical conveyor 22 is configured to vertically convey the trays 4 in a downward path. In the first embodiment shown in FIG. 1, the loading conveyor 14 is configured to introduce groups of three trays 4 in the reception level, the vertical conveyor 22 is configured to vertically convey successive groups of three trays 4 between the reception and delivery levels forming a triple column of trays 4 inside the enclosure 2, and the unloading conveyor 15 is configured to extract groups of three trays 4 from the delivery level. Obviously, the unit could alternatively be built to handle individual trays or groups of another different number of trays.

The forced convection treatment unit also comprises an air circulation device 3 configured and arranged to make conditioned air pass through the inside of said enclosure 2 and around said slices while the trays 4 with the slices arranged thereon are conveyed by said conveyor device 1. As is better shown in the diagram of FIG. 2, the mentioned air circulation device 3 comprises an inlet conduit 9 connected to a first inlet port 5 located on a first side of the enclosure 2 and in communication with the inside thereof. This first inlet port 5 directly faces a first outlet port 6 located on an opposite second side of the enclosure 2 and in communication with the inside thereof. On said second side of the enclosure 2 and in communication with the inside thereof there is a second inlet port 7, which is located adjacent and below said first outlet port 6. A deflector conduit 10 is connected at a first end to the first outlet port 6 and at a second end to the second inlet port 7. This second inlet port 7 directly faces a second outlet port 8 located on the first side of the enclosure 2 and in communication with the inside thereof, which is adjacent and below said first inlet port 5. An outlet conduit 11 is connected to said second outlet port 8.

The air circulation device 3 further includes at least one air moving device, such as a ventilator or a turbine (not shown) associated, for example, to said inlet conduit 9 to drive conditioned air inside it. The conditioned air is introduced into the enclosure 2 through the first inlet port 5 and is extracted through the first outlet port 6, such that between the first inlet and outlet ports 5, 6 there is established a first conditioned air current inside the enclosure 2. The conditioned air extracted through the first outlet port 6 is led by said deflector conduit 10 towards the second inlet port 7, through which it is introduced again into the enclosure 2. The air introduced through the second inlet port 7 is extracted from the enclosure 2 through the second outlet port 8, such that between the second inlet and outlet ports 7, 8 there is established a second conditioned air current inside the enclosure 2.

The inlet conduit 9 and the outlet conduit 11 are generally communicated to one another through an air conditioning unit (not shown), such that the air moving device provided to drive conditioned air in the inlet conduit 9 and through the first inlet port 5 also causes a suction effect in the outlet conduit 11 and through the second outlet port 8, and this favors the flow of the two currents in the enclosure 2. Alternatively, the air moving device, rather than being a driving device, could be arranged to suck conditioned air in the outlet conduit 11 and through the second outlet port 8, and this, if the inlet and outlet conduits 9, 11 are communicated through said air conditioning unit, would likewise cause a driving effect in the inlet conduit 9 and through the first inlet port 5. Optionally, the air circulation device 3 can include a second air moving device, such as a ventilator or turbine (not shown), arranged in the deflector conduit 10 to suck conditioned air through the first outlet port 6 and drive it through the second inlet port 7. It is also helpful that one or both of the first and second inlet ports 5, 7 are equipped with a plurality of directing flanges 16 (FIG. 2) to aid in directing the conditioned air current therethrough. Likewise, one or both of the first and second outlet ports 6, 8 can be equipped with corresponding directing flanges.

The first and second inlet and outlet ports 5, 6, 7, 8 are positioned in relation to the housing 21 and the conveyor device 1 such that said first and second conditioned air currents flow in mutually parallel opposite directions through two respective differentiated regions of the enclosure 2 traversed by the trays 4 in their path from the reception opening 12 to the delivery opening 13. Furthermore, the first and the second conditioned air currents are parallel to said permeable support surface of the trays 4 and transverse to the direction of travel of the conveyor device. The first inlet and outlet ports 5, 6 are sized and arranged to make the first conditioned air current pass through a half of the path of the trays 4 inside the enclosure and the second inlet and outlet ports 7, 8 are sized and arranged to make the second conditioned air current pass through another half of the path of the trays 4 inside the enclosure. The slices arranged on the trays 4 are thus subjected to the impingement of the conditioned air of both opposite first and second currents during their path between the reception and delivery openings 12, 13. A greater uniformity in the drying of the slices along the width of the trays is thereby achieved in comparison with a conventional forced convection treatment unit provided with a single conditioned air current.

Although FIG. 2 shows by means of arrows the first conditioned air current from right to left through an upper region of the enclosure 2 and the second conditioned air current from left to right through a lower region of the enclosure 2, the directions and/or the positions of the first and second currents could be the reverse ones with an equivalent result. Inside the enclosure 2 there is no physical separation between the two regions through which the first and second conditioned air currents flow, such that both currents have respective surfaces in friction contact where turbulences are created that do not noticeably negatively affect the action of drying the slices.

Figure 3:
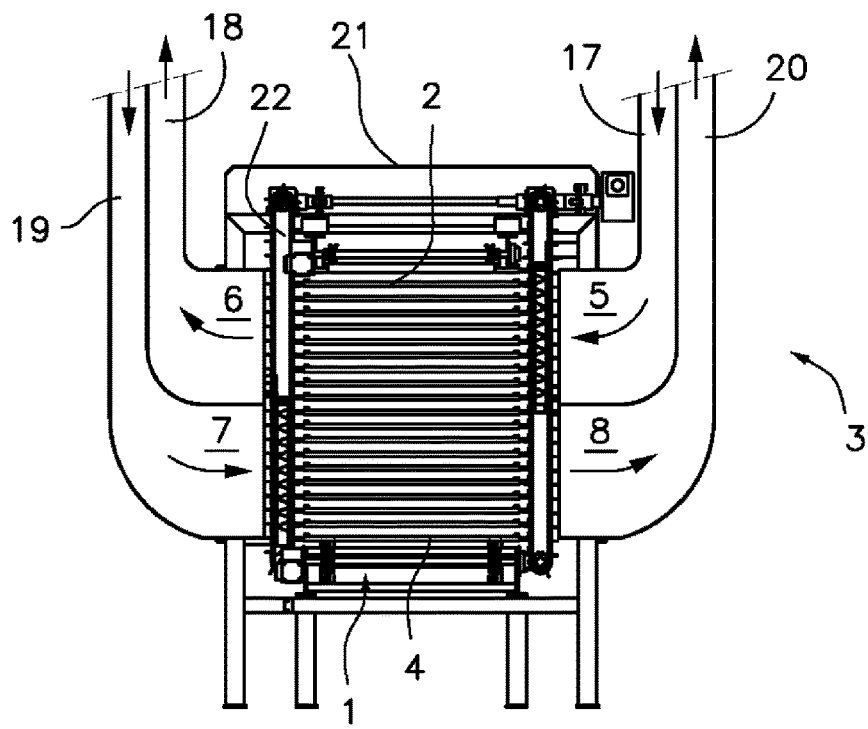
FIG. 3 is a schematic cross-section view of a variant of the treatment unit of FIG. 1.

In relation to FIG. 3, a variant of the first embodiment shown in FIGS. 1 and 2 is now described in which the housing 21, the enclosure 2, the conveyor device 1 and the arrangement of first and second inlet and outlet ports 5, 6, 7, 8 in the housing 21 are the same as those described above in relation to FIGS. 1 and 2. The difference lies in the fact that, in the unit of FIG. 3, the air circulation device 3 comprises a first inlet conduit 17 connected to the first inlet port 5 and a first outlet conduit 18 connected to the first outlet port 6, as well as a second inlet conduit 19 connected to the second inlet port 7 and a second outlet conduit 20 connected to the second outlet port 8. The flows of the first and second conditioned air currents are thus independent.

For example, the mentioned first inlet and outlet conduits 17, 18 can be communicated to one another through an air conditioning unit (not shown), and a first air moving device (not shown) can be arranged to drive conditioned air in the first inlet conduit 17 and through the first inlet port 5, which will cause at the same time a suction effect in the first outlet conduit 18 and through the first outlet port 6. Alternatively, this first air moving device can be provided to suck conditioned air in the first outlet conduit 18 and through the first outlet port 6, which will cause at the same time a driving effect in the first inlet conduit 17 and through the first inlet port 5. In a similar way, said second inlet and outlet conduits 19, 20 can be communicated to one another through the same air conditioning unit as the first circuit, or another. In any case, a second air moving device (not shown) can be arranged to drive conditioned air in the second inlet conduit 19 and through the second inlet port 7, which will cause at the same time a suction effect in the second outlet conduit 20 and through the second outlet port 8. Alternatively, this second air moving device can be arranged to suck conditioned air in the second outlet conduit 20 and through the second outlet port 8, which will cause at the same time a driving effect in the second inlet conduit 19 and through the second inlet port 7.

Figure 4:
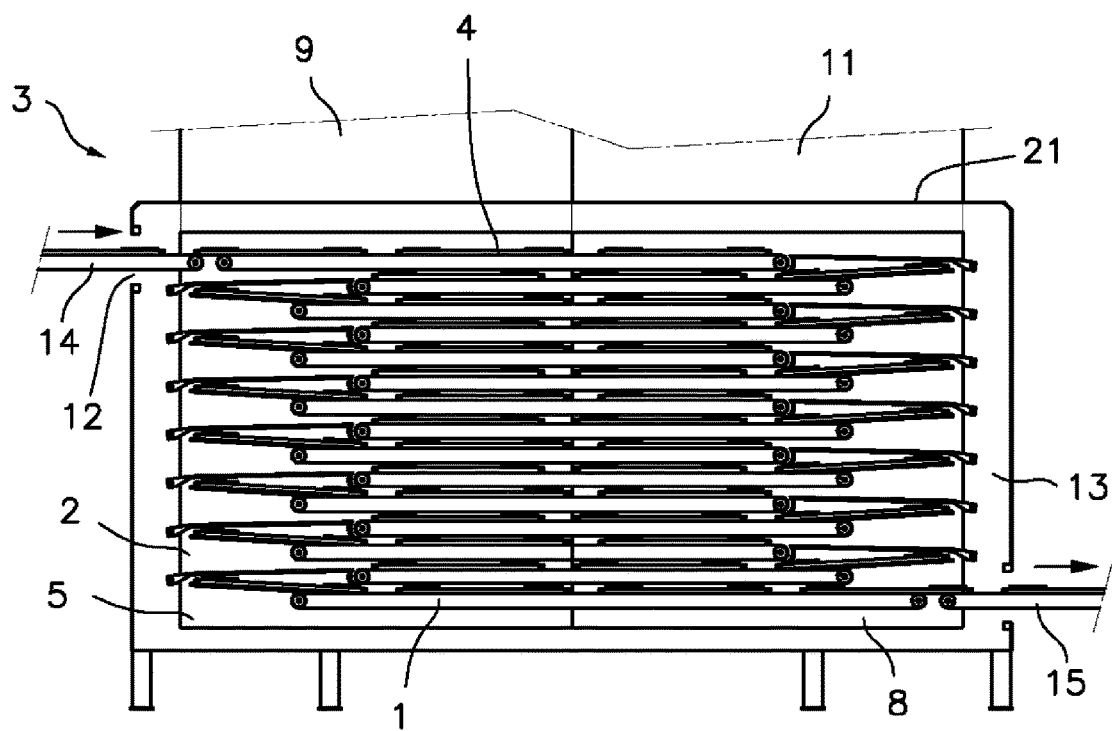
FIG. 4 is a schematic cross-section view of another embodiment of a forced convection treatment unit according to the present invention.
Figure 5:
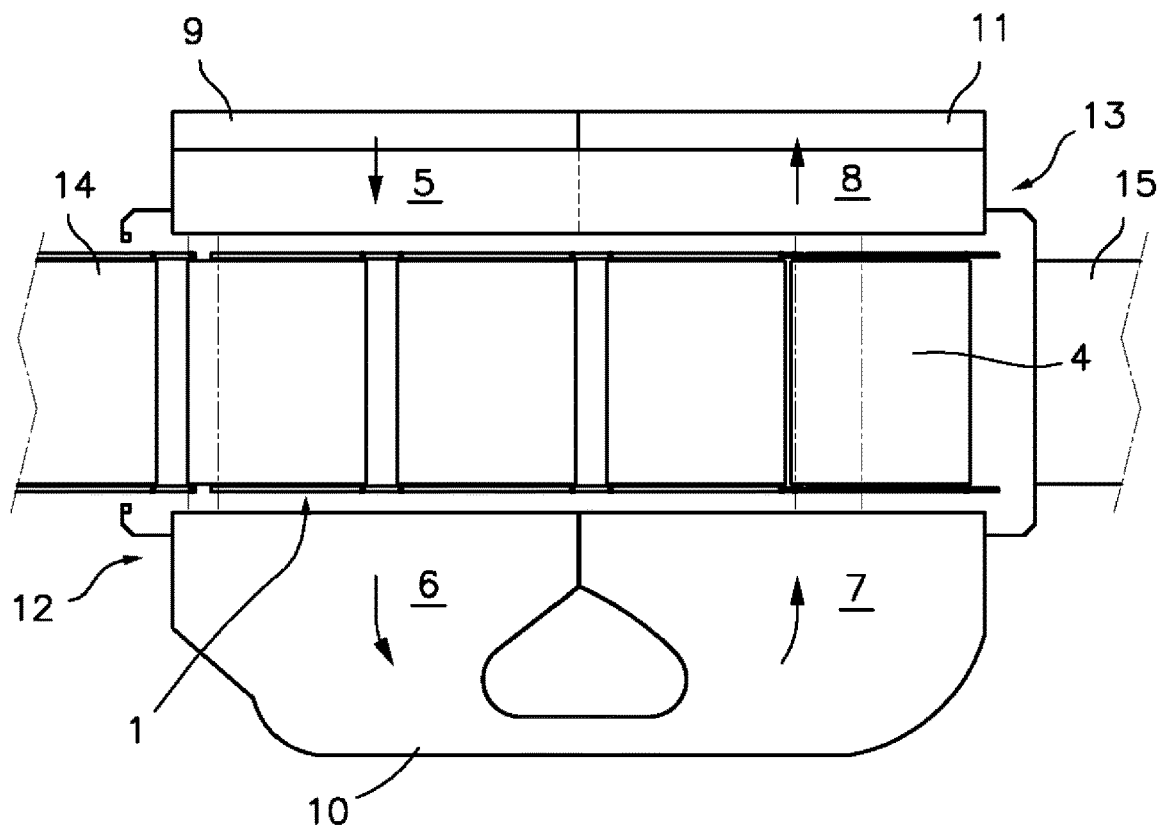
FIG. 5 is a schematic upper view of the treatment unit of FIG. 4.

FIGS. 4 and 5 show a second embodiment of the forced convection treatment unit, which comprises a housing or box 21 defining an enclosure 2 with a reception opening 12, located at a reception level close to the upper part of the housing 21, at a first end thereof, and a delivery opening 13, located at a delivery level close to the bottom of the housing 21, at an opposite second end thereof. The unit includes a conveyor device 1 comprising a plurality of superimposed sections configured to convey a plurality of trays 4 from said reception opening 12 to said delivery opening 13. To that end, the different sections of the conveyor device 1 are actuated in alternately opposite directions, and at the end of each section there is an arrangement of guides to guide the trays from the end of each section to the start of the immediately lower section, in a known way. Each tray 4 has a permeable support surface, along the width and length of which the slices of the meat product to be dried are arranged. Alternatively, the sections of the conveyor device can be conveyor belts providing the permeable support surface, and the slices can be arranged directly on the conveyor belts, as described in the mentioned international patent application WO 2008135616. In any case, the slices are conveyed in a combined path in opposite horizontal directions and in a downward vertical direction from the reception opening 12 to the delivery opening 13.

In this second embodiment, the housing 21 has first inlet and outlet ports 5, 6 in communication with the enclosure 2, and second inlet and outlet ports 7, 8 in communication with the enclosure 2. The arrangement of said first and second inlet and outlet ports 5, 6, 7, 8 is similar to that described in relation to the first embodiment, except that here the first inlet and outlet ports 5, 6 are adjacent to and side to side with the second inlet and outlet ports 7, 8, as shown in the diagram of FIG. 5. An inlet conduit 9 is connected to the first inlet port 5, a deflector conduit 10 is connected to the first outlet port 6 at one end and the second inlet port 7 at the other end, and an outlet conduit 11 is connected to the second outlet port 8. At least one air moving device, such as a ventilator or a turbine (not shown) is associated, for example, to said inlet conduit 9 to drive conditioned air inside it or to said outlet conduit 11 to suck air inside it for the purpose of creating a first current from the first inlet port 5 to the first outlet port 6 and second current from the second inlet port 7 to the second outlet port 8. It will be observed that these first and second conditioned air currents flow in mutually parallel opposite directions through two respective regions of the enclosure 2 traversed by the trays 4 in accordance with the horizontal component of their path from the reception opening 12 to the delivery opening 13. It will furthermore be observed that the first and second conditioned air currents are parallel to the permeable support surface of the trays 4 or of the conveyor belts and transverse to the direction of travel of the conveyor device. Optionally, if necessary, a second air moving device can be arranged in the deflector conduit 10.

Figure 6:
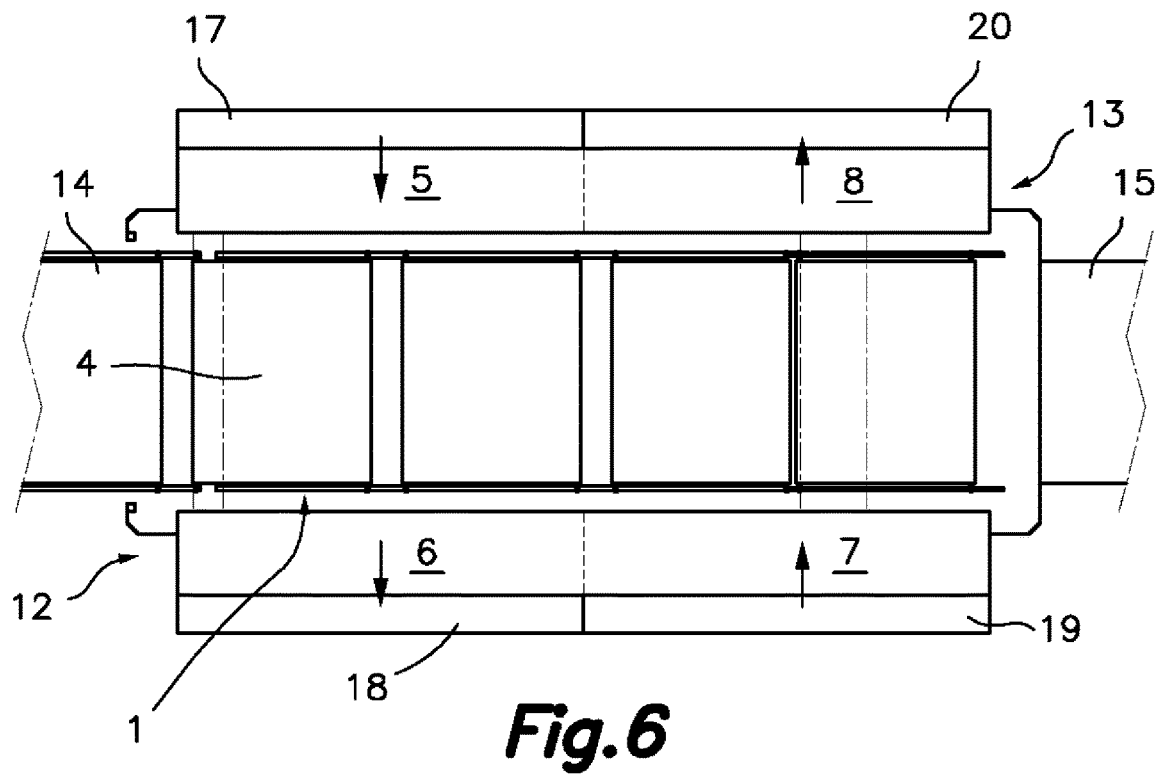
FIG. 6 is a schematic upper view of a variant of the treatment unit of FIG. 4.

FIG. 6 shows a variant of this second embodiment, in which the only difference is that a first inlet conduit 17 is connected to the first inlet port 5 and a first outlet conduit 18 is connected to the first outlet port 6, and in parallel a second inlet conduit 19 is connected to the second inlet port 7 and a second outlet conduit 20 is connected to the second outlet port 8. The flows of the first and second conditioned air currents are thus independent. This requires at least one first air moving device, such as a ventilator or a turbine (not shown), arranged to drive conditioned air inside the first inlet conduit 17 or suck air inside said first outlet conduit 18 for the purpose of creating the first current, and at least one second air moving device, such as a ventilator or turbine (not shown), arranged to drive conditioned air inside the second inlet conduit 19 or suck air inside the second outlet conduit 20 for the purpose of creating the second current.

It will be understood that in this second embodiment, and in accordance with the vertical component of the path of the slices inside the enclosure 2, the first inlet and outlet ports 5, 6 could alternatively be arranged adjacent and above the second inlet and outlet ports 7, 8 as in the unit of the first embodiment, with an equivalent result.

Figure 7:
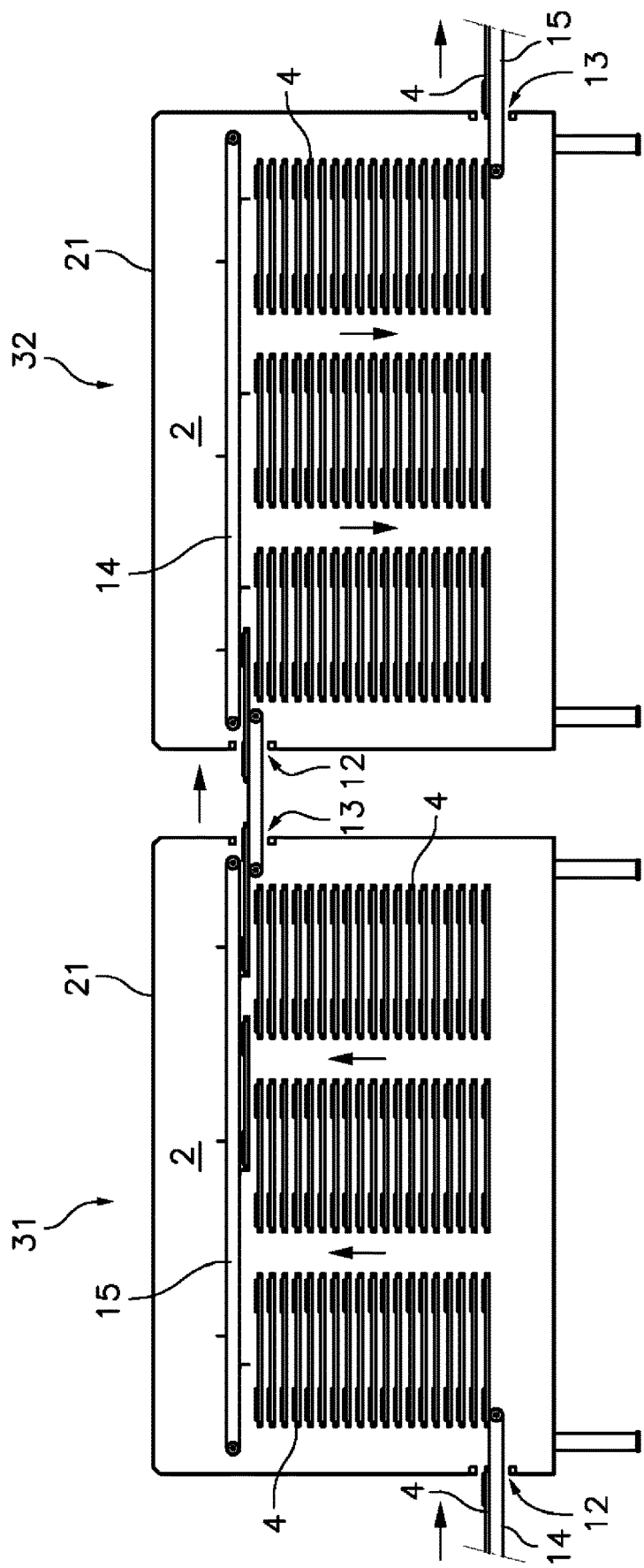
FIG. 7 is a schematic side view of a forced convection treatment line made up of two linked treatment units, similar to the treatment unit of the first embodiment shown in FIG. 1.

In relation to FIG. 7, a forced convection treatment line is now described made up of two linked units 31, 32, each of which is similar to the forced convection treatment unit of the first embodiment shown in FIGS. 1 and 2. Here, a first unit 31 of the line has the loading inlet 12 next to the bottom of the enclosure 2 at a first end of the housing 21 and the unloading opening 13 next to the upper part of the enclosure 2 at an opposite second end of the housing 21. A second unit 32 of the line has the loading inlet 12 next to the upper part of the enclosure 2 at a first end of the housing 21 and the unloading opening 13 next to the bottom of the enclosure 2 at an opposite second end of the housing 21, such that the loading opening 12 of the second unit 32 directly faces the unloading opening 13 of the first unit 31. The trays which are extracted through the unloading opening 13 of the first unit 31 are thus immediately introduced through the loading opening 12 of the second unit 32. The treatment time is thereby prolonged without slowing down the travel rate of the trays along the line. In FIG. 7, the arrows indicate the path of the trays 4 inside the enclosures 2. It will be understood that additional units could similarly be added to the drying line. It will also be understood that all the units 31, 32 of the line can have substantially the same construction and can be arranged in opposite positions and actuated to operate in reverse directions.

A process for preparing a sausage meat product which can be carried out using the forced convection treatment unit of the present invention described above is useful for preparing a sausage meat product cut into slices in which the sausage meat product is relatively tender, or in other words, has a relatively low level of maturing or curing and a relatively high degree of moisture. This process comprises preparing a mass with one or more comminuted meat products, optionally with one or more condiments, and stuffing said mass in a casing to form sausage products. Then, the mass is allowed to ferment in the sausage products. Afterwards, the sausage products are cooled to a sufficiently low temperature (generally until freezing) to allow cutting them into slices without them breaking down, and cutting the chilled sausage products into slices. Finally, the slices are dried until achieving a predetermined weight reduction with respect to the weight of the recently cut slices, i.e., of the slices after the fermentation.

The forced convection treatment unit described above is useful for carrying out the mentioned step of drying the slices. To that end, the slices are arranged in a single layer on a permeable support surface and conveyed thus arranged along a path inside an enclosure 2, and at the same time as at least first and second mutually parallel conditioned air currents are made to pass, in opposite directions parallel to said support surface and transverse to the direction of travel of the slices, through two successive regions of the enclosure 2 positioned in relation to said path such that the slices, during their movement inside the enclosure 2, they are affected by both first and second currents.

The slices will be arranged individually separated along the length and width of said permeable support surface to facilitate the passage of the conditioned air currents therearound. The opposite conditioned air currents create two corresponding opposite thermal gradients across the conveyor device 1 in the two successive regions of the enclosure 2, resulting in a uniform curing of the slices. Only with the mentioned forced conditioned air convection treatment for 10 minutes to 70 minutes, a weight reduction of 8% to 35% with respect to the weight of the recently cut slices can be achieved, which is the suitable weight reduction for this type of relatively tender sausage products.

By way of example, the first conditioned air current can be at a temperature of 15° C. to 40° C. and a relative humidity of 30% to 40% at the first inlet port 5, and can flow at a speed of 2 m/s to 5 m/s at the first inlet port 5. The second conditioned air current can be in the same conditions at the second inlet port 7 as the first conditioned air current at the first inlet port 5 if the flows of the two currents are independent (FIGS. 3 and 6), or at a slightly lower temperature, a slightly higher relative humidity and a slightly lower speed at the second inlet port 7 if one and the same flow provides the two currents with the aid of the deflector conduit 10 (FIGS. 2 and 5). After the step of drying, at the outlet of the forced convection treatment unit, or at the outlet of a forced convection treatment line formed by several units, the process comprises forming groups of dried slices arranged in a desired format and packaging the slices under vacuum or in a modified atmosphere.

An installation for carrying out the drying operations of the process will typically comprise one or more devices for cutting the previously cooled sausage products into slices, a device for arranging the slices in trays 4, one or more forced convection treatment lines, each of which is formed by one or more forced convection treatment units as described above, and one or more packaging units, all of them linked by suitable conveyor devices for conveying the trays 4 with the slices. The installation can include a return conveyor device for returning the empty trays again to the device for arranging the slices in trays passing through a tray cleaning device, and one or more temporary storage units, or "buffers", arranged in strategic places both of the loaded tray conveying line and of the empty tray conveying line.

The scope of the present invention is defined in the attached claims.

What is claimed is:

1. A forced convection treatment unit for treating a meat product cut into slices, comprising: an enclosure defining a path from a reception opening to a delivery opening between opposite first and second sides; a conveyor device configured to convey slices of the meat product arranged in a single layer on a permeable support surface along the path inside the enclosure; an air circulation device comprising at least one air moving device associated to an arrangement of conduits provided with a plurality of inlet and outlet ports in communication with the inside of the enclosure and configured and arranged to make conditioned air pass through the inside of the enclosure and around the slices while the slices are conveyed by the conveyor device; wherein the plurality of inlet and outlet ports comprises: a first inlet port located at the first side of the enclosure; a first outlet port located at the second side of the enclosure directly facing the first inlet port; a second inlet port located at the second side of the enclosure adjacent the first outlet port; a second outlet port located at the first side of the enclosure adjacent the first inlet port and directly facing the second inlet port; wherein the first inlet port and the first outlet port are sized and arranged to make a first conditioned air current flowing in a direction parallel to the support surface and transverse to the direction of travel of the conveyor device pass through a half of the path from the reception opening to the delivery opening; and the second inlet port and the second outlet port are sized and arranged to make a second conditioned air current flowing in a direction parallel to the support surface and transverse to the direction of travel of the conveyor device pass through another half of the path from the reception opening to the delivery opening; so that the slices which are conveyed by the conveyor device within the enclosure are uniformly dried in the entire width of the support surface of the conveyor by the effect of the first and second conditioned air currents flowing in opposite directions in respective halves of the path.

2. The forced convection treatment unit according to claim 1, wherein the conveyor device is configured to convey a plurality of trays along the path within the enclosure, each tray being provided with a horizontal permeable support surface on which the slices are arranged in a single layer.

3. The forced convection treatment unit according to claim 2, wherein the path inside the enclosure is a vertical path from a reception level where the reception opening is arranged to a delivery level where the delivery opening is arranged, and the conveyor device comprises a vertical conveyor configured to convey the trays within the enclosure arranged in a horizontal position and in a vertical direction.

4. The forced convection treatment unit according to claim 3, wherein the conveyor device further comprises a loading conveyor for receiving the trays and introducing them into the enclosure through the reception opening, and an unloading conveyor for unloading the trays from the enclosure through said delivery opening.

5. The forced convection treatment unit according to claim 2, wherein the path inside the enclosure is a combined horizontal and vertical path from a reception level where the reception opening is arranged to a delivery level where the delivery opening is arranged, and the conveyor device comprises a plurality of superimposed horizontal sections actuated to convey the trays within the enclosure arranged in a horizontal position and in alternate opposite horizontal directions and an arrangement of guides guiding the trays from the end of each section to the start of the immediately upper or lower section.

6. The forced convection treatment unit according to claim 5, wherein the conveyor device further comprises a loading conveyor for receiving the trays and introducing them into the enclosure through the reception opening, and an unloading conveyor for unloading the trays from the enclosure through said delivery opening.

7. The forced convection treatment unit according to claim 1, wherein the arrangement of conduits comprises an inlet conduit connected to the first inlet port, a deflector conduit having a first end connected to the first outlet port and a second end connected to the second inlet port, and an outlet conduit connected to the second outlet port.

8. The forced convection treatment unit according to claim 7, wherein at least one of the first inlet port, first outlet port, second inlet port and second outlet port is equipped with a plurality of directing flanges configured to direct the conditioned air current therethrough.

9. The forced convection treatment unit according to claim 7, wherein the inlet conduit and the outlet conduit are communicated to one another through an air conditioning unit, and a first air moving device is arranged to drive conditioned air in the inlet conduit and through the first inlet port, or to suck conditioned air in the outlet conduit and through the second outlet port.

10. The forced convection treatment unit according to claim 9, wherein a second air moving device is arranged in the deflector conduit to suck conditioned air through the first outlet port and drive conditioned air through the second inlet port.

11. The forced convection treatment unit according to claim 1, wherein the arrangement of conduits comprises a first inlet conduit connected to the first inlet port, a first outlet conduit connected to the first outlet port, a second inlet conduit connected to the second inlet port, and a second outlet conduit connected to the second outlet port.

12. The forced convection treatment unit according to claim 11, wherein at least one of the first inlet port, first outlet port, second inlet port and second outlet port is equipped with a plurality of directing flanges configured to direct the conditioned air current therethrough.

13. The forced convection treatment unit according to claim 11, wherein the first inlet conduit and the first outlet conduit are communicated to one another through an air conditioning unit, and a first air moving device is arranged to drive conditioned air in the first inlet conduit and through the first inlet port or to suck conditioned air in the first outlet conduit and through the first outlet port, and the second inlet conduit and the second outlet conduit are communicated to one another through an air conditioning unit, and a second air moving device is arranged to drive conditioned air in the second inlet conduit and through the second inlet port or to suck conditioned air in the second outlet conduit and through the second outlet port.

* * * * *